May 3, 1960  J. A. MONTEIL  2,935,027
MECHANICAL SYSTEM FOR REPLACING ALTERNATE MECHANICAL UNITS
Filed Oct. 6, 1955  2 Sheets-Sheet 1

INVENTOR.
Jean André Monteil.
BY Maxwell E. Sparrow.

ATTORNEY.

May 3, 1960 J. A. MONTEIL 2,935,027
MECHANICAL SYSTEM FOR REPLACING ALTERNATE MECHANICAL UNITS
Filed Oct. 6, 1955 2 Sheets-Sheet 2

*INVENTOR.*
Jean Andre Monteil.
BY Maxwell E. Sparrow.
ATTORNEY.

20

United States Patent Office 2,935,027
Patented May 3, 1960

2,935,027
MECHANICAL SYSTEM FOR REPLACING ALTERNATE MECHANICAL UNITS

Jean André Monteil, Paris, France

Application October 6, 1955, Serial No. 538,997

Claims priority, application France October 7, 1954

7 Claims. (Cl. 103—125)

This invention relates to mechanical, rotating, driving or driven devices capable of replacing alternate mechanical units such as cylinders, pistons, tie-rods or push-rods and cranks, as they are generally used.

The driven or driving device according to this invention supplants earlier, conventional systems of this general type.

In principle this device or system consists of a combination of rotary elements of which one, centrally mounted, constitutes the main component (driving or driven unit) whereas one or several others positioned upon the periphery of the former, and mechanically connected to it, act as work-zone separators.

This device is essentially characterized by the fact that most of the lines and surfaces in contact between fixed and movable components, or between various moving parts, are localized upon the periphery of the central rotor.

This structural characteristic mainly entails the reduction, or even the practical elimination within the body of the device itself, of the drawbacks of pollution or fouling which may result from the depositing of impurities contained in fluids flowing through the device or from deposits left by the varying degrees of lubricant-combustion, etc.

Said structure also facilitates rapid access to essential components of said device and, hence, cleaning or possibly replacing of parts.

The device according to this invention essentially consists of the following members:

(1) A grooved friction wheel or rotor at the center of the device, capable of rotating about a hollow shaft, which shaft is supported by bearings set on the machine chassis. The groove of this rotor is subdivided into sections, completely insulated from each other by teeth or blades extending from one edge of the groove to the other, over the entire elevation of same, said blades being preferably positioned parallel to the wheel's axis of rotation.

(2) One or several secondary shutter wheels, or closing devices, positioned about the preceding component, said shutter wheels having a smaller diameter than that of the grooved friction wheel or rotor and being provided with one or more peripheral recesses which may be engaged during the rotation of the device by the teeth or blades of the rotor, said secondary shutter wheels being almost as wide as the free area between the walls of the rotor wheel's groove, the diameters of these wheels being such that the circumference of the secondary shutter wheels approaches that of the rotor wheel at the bottom of the groove or such that said secondary shutter wheels may even roll in contact with the bottom of said groove.

(3) A casing or housing which houses, on the one hand, the periphery of the rotor wheel within the areas separating the secondary shutter wheels and, on the other hand, these secondary shutter wheels themselves on their periphery as well as on their sides, or, more precisely, those parts of said sides which are not engaged between the walls of the rotor wheel's grooves.

The unit formed by combination of the three component groups hereinabove described (main grooved and bladed friction wheel or rotor, peripheral or secondary shutter wheels with recesses, and housing delimits a series of annular areas practically isolated from each other and each isolated from the exterior of the device, between the walls of the groove of the rotor wheel, by the blades of the latter, the peripheral partitions of the secondary shutter wheels and the housing enclosing the entire device. These different peripheral areas may be placed in communication with each other, and/or with the exterior of the unit, in various ways of which the two hereinbelow described are among the simplest:

(a) On either side of each of the secondary shutter wheels, orifices may be provided within the peripheral housing which overlies the groove of the main wheel. These orifices may be closed preferably by rotary stoppers actioned by the movement of the main system or in any other manner.

(b) On either side of each blade or tooth of the groove of the rotor wheel, conduits may be provided connecting the bottom of said groove with the shaft of the rotor wheel. The interior of this hollow shaft communicates, on the one hand, with the above-cited conduits and, on the other, with orifices provided in its periphery, these orifices intermittently connecting with apertures provided in valve rings set integrally into the chassis supporting the device. Tubes mounted on these rings complete the circuit of conduits which can join the bottom of the groove of the rotor wheel with the exterior of the unit. The rotation of various components of the latter periodically causes the orifice opening onto the hollow shaft via the rings surrounding the latter to open and to close.

Expedients (a) and (b) above may be utilized in combination.

For instance, if the admission of a liquid or gaseous material occurs through one of the rings surrounding the hollow shaft and one of the conduits opening onto the bottom of the groove of the rotor wheel, the evacuation of said material or of its residues may take place by one of the orifices in the housing covering the groove of the said rotor wheel, or vice versa.

The example below describes, but does not limit, one embodiment of the device according to the invention with reference to the accompanying drawing, in which.

Figure 1:
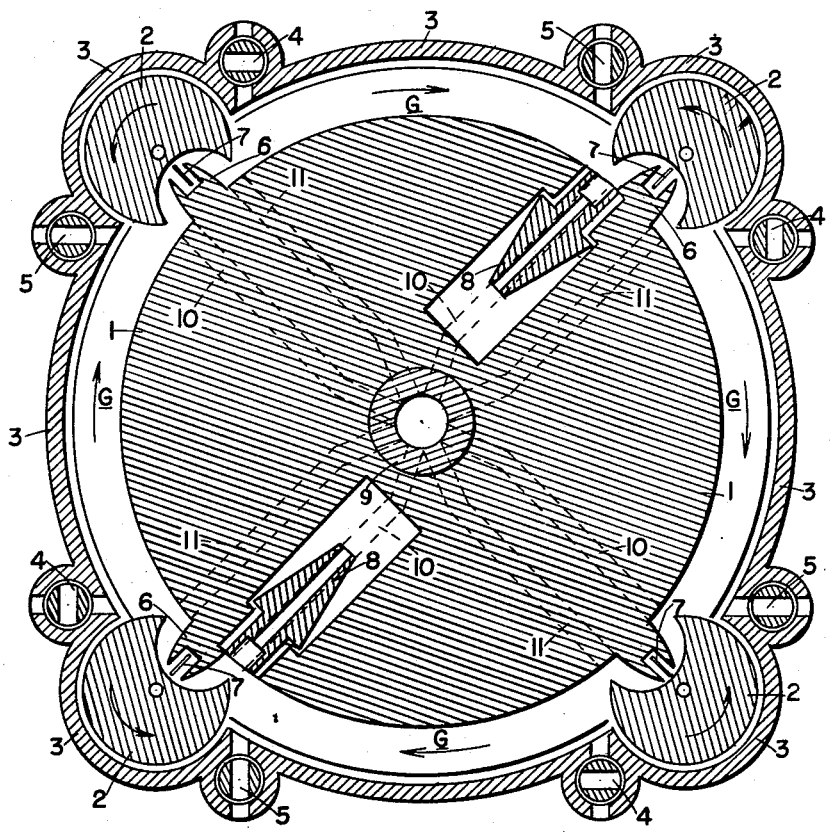
Fig. 1 is a section of the contrivance taken on line I—I of Fig. 2.

As shown in the drawing the contrivance or device according to this invention comprises a rotor wheel 1, having a groove G, provided with blades or teeth 6 which are distributed regularly on the periphery of the wheel and divide the groove into equal segments isolated from one another. Rotor wheel 1 is partially encased on its periphery by housing 3, with the least play possible. Annular segments 17 may be provided, set in grooves provided all about rotor wheel 1, on either side of groove G, in planes parallel to the latter. Under the action of the centrifugal force, these segments can position themselves against the lower partition of the housing 3, thus increasing the insulation of the annular space comprised between the walls of groove G and the housing 3 with respect to the exterior of the unit.

In recesses within housing 3, other shutter wheels 2, freely rotatable about rotor wheel 1, are inserted into groove G. Their diameter is such that their circumferences are but a small distance from the bottom of groove G. These shutter wheels 2 may even be in contact with the bottom of groove G, rolling upon the latter without friction or slippage.

The number of shutter wheels 2 is a function of the number of blades or teeth 6 of rotor wheel 1. The width of shutter wheels 2 is only slightly smaller than the lateral distance between the walls of groove G, in such manner that, by processes currently in use, such as slotting of walls, local lubrication etc., the insulation of successive compartments of groove G may be rendered as complete as possible solely by the presence of various shutter wheels 2, delimiting them at each end.

Housing 3, surrounding rotor wheel 1, extends about shutter wheels 2 and encloses the latter also along their sides, giving passage only to their rotation-shafts. On the sides of shutter wheels 2, this housing stops a short distance from the exterior circumference of rotor wheel 1. The shafts of the various shutter wheels 2 are connected with the shaft of rotor wheel 1 by a set of gears which can be similar to that shown in the drawing without reference numbers, or by any other coupling permitting shutter wheels 2 to turn in synchronism with rotor wheel 1.

Blades or teeth 6 of rotor wheel 1 may thus engage the recesses of shutter wheels 2 with precision. These same teeth or blades may be provided with lamellae 7, slidably inserted into grooves provided along their crest. Under the action of the centrifugal force, these lamellae 7, position themselves during the rotation of rotor wheel 1 onto the internal partition of housing 3. They thus insure good insulation between the successive areas of groove G, on either side of blades or teeth 6.

The annular space delimited by the partitions of groove G and housing 3 is rendered tight with respect to the exterior of the unit, during the rotation of rotor wheel 1, by means of the aforementioned annular segments 17, and said annular space may be connected with the exterior in various ways. The simplest methods are described below:

(a) Orifices 4 and 5, positioned on either side of each of shutter wheels 2, are set in the circumferential partition of housing 3. These orifices connect peripheral groove G, with the exterior of the unit; they may be provided with stoppers which may open or shut them periodically. These stoppers, preferably rotary in nature, are controlled by mechanisms not shown in the drawing.

(b) Conduits 10 and 11 extend within the rotor wheel 1, on either side of each of blades or teeth 6, and connect the bottom of groove G with a conduit provided in the axis of shaft 9 of rotor wheel 1.

Figure 2:
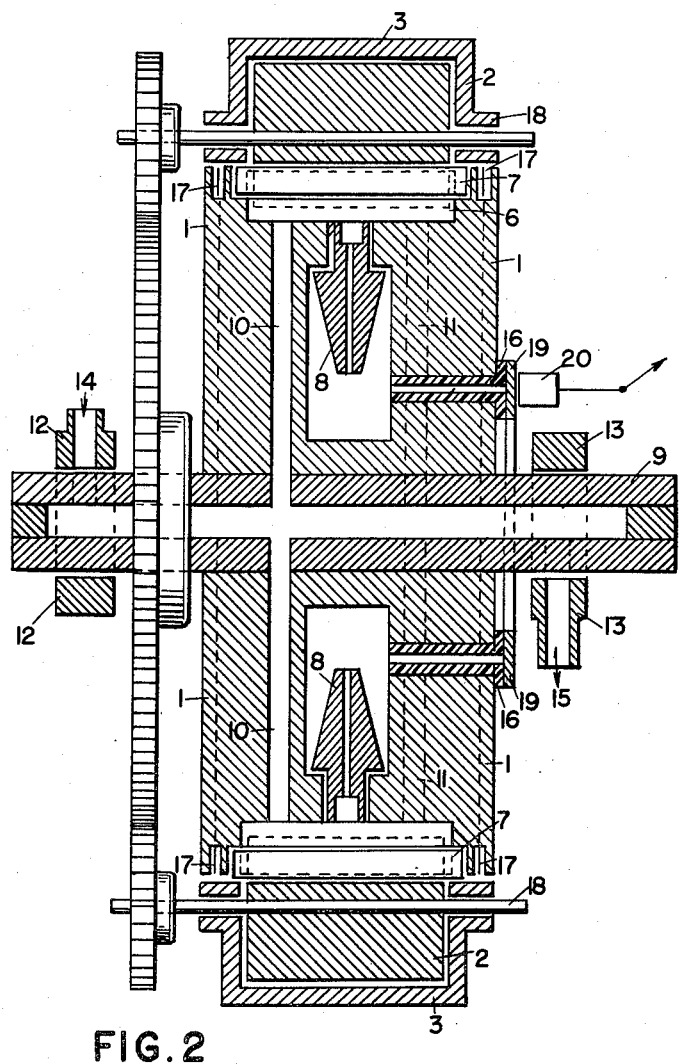
Fig. 2 is a section taken on the broken line II—II of Fig. 1.

A part of this axial conduit of shaft 9 connects the left-hand set of conduits 10 (as viewed in Fig. 2) with the exterior of the unit through a stationary ring 12, surrounding the shaft 9 and pierced by an orifice periodically coinciding with the one provided in shaft 9. The opening of said ring is, in turn, connected to a tube 14. The angular position of ring 12 may be adjusted at any time in order to vary the positions in which the conduits 10 connect groove G with the exterior of the unit as required.

The other section of the axial conduit of shaft 9 permits the connection of groove G with the outside by means of conduits 11, a ring 13, and a tube 15. As is the case with ring 12, the angular position of ring 13 is also adjustable.

The orifices 4, 5 and the conduits 10, 11 may be used in combination, e.g. respectively for the inlet and the outlet (or vice versa) of a fluid as stated above.

The operation of the device illustrated in the drawing, as well as that of other possible embodiments, will be properly understood by referring to the drawing and to the explanations and descriptions which follow. Some of the possibilities and uses of this contrivance are described below, in non-limiting examples.

A. *Displacement of fluids*

Operating as a suction and pressure pump, vacuum pump or high-pressure pump, etc.

Considering an area limited by two successive shutter wheels 2, on the one hand, and, on the other, by the walls of groove G of rotor wheel 1, and also by housing 3, and assuming rotor wheel 1 is turned in clockwise direction as indicated by the arrow, each tooth 6, upon disengaging the recess of a shutter wheel 2, creates negative pressure as it moves in the growing area between itself and shutter wheel 2. This negative pressure draws through orifices 4, supposedly open, the fluid to be moved which fills the annular space of groove G behind tooth 6. The latter passes orifice 5, maintained open, and engages the recess of the next shutter wheel 2. At this moment tooth 6, following the former, disengages from the first shutter wheel 2 as hereinabove described, and with its lower side pushes the liquid contained in groove G, through orifices 5, towards the outside of the unit whence a conduit brings same to the desired point.

The unit may, hence, be used to move fluids.

B. *Operation as a steam engine*

With rotor wheel 1 turning in the direction of the arrow, and upon tooth 6 having moved slightly beyond orifice 4, the latter opens and steam penetrates into the annular area G between shutter wheel 2, tooth 6, and the housing. The opening of orifice 4 may be more or less wide and more or less rapid. Steam expands and causes the propulsion of tooth 6 and, hence, of rotor wheel 1 which rotates. It is evacuated, thereafter, via orifice 5, either into the open air, or towards a condenser, or else towards yet another device using its residual pressure or its heat; the latter device, operating on medium or low pressure, may be identical, dimensionwise, with the unit just operated by said steam.

C. *Operation as an internal-combustion engine (gas, gasoline, etc.)*

With rotor wheel 1, turning in the direction of the arrow, the mixture of air and fuel is introduced under pressure by way of orifice 4, which opens after tooth 6 has moved past it. The mixture fills the annular area delimited by housing 3, the walls of groove G, shutter wheel 2, and tooth 6. In due time orifice 4 closes and a spark plug 8, preferably placed in the bottom of groove G at the base of the upstream end of tooth 6, ignites the mixture which explodes and, in expanding, thrusts at tooth 6, thus causing rotor wheel 1 to rotate. As soon as tooth 6 has passed beyond orifice 5, the combustion gases escape to the outside of the device via this orifice. Moreover, they are constrained to do so by the upstream face of the next tooth 6.

To operate the unit as a heavy-fuel power plant (diesel etc.), orifices 4, may be placed in such manner that fuel can be injected into the unit concurrently with compressed air or at the desired moment so that mixture occurs by turbulence and ignition can be produced either spontaneously or through the use of spark plug 8.

It is apparent that the apparatus just described permits use of the conduits 10, 11 in the same manner as orifices 4 and 5 are used, to wit: tubes 14, ring 12, hollow shaft 9, conduits 10, and, on the other hand, conduits 11, shaft 9, ring 13, and tubes 15, in all practical applications.

It is evident that the invention is not limited to the embodiments above described or represented and that details may be modified without leaving the framework of the invention. Moreover, the few uses hereinabove detailed do not limit the range of application of the invention.

I claim:

1. A rotary device comprising a rotor wheel provided with a peripheral groove and a plurality of blades within said groove dividing the latter into a plurality of segmental channels, a housing surrounding said rotor wheel and overlying said groove, thereby substantially closing said channels, a plurality of shutter wheels rotatably mounted in said housing and projecting into said groove so as effectively to subdivide each channel into two portions varying in length during relative rotation between said rotor wheel and said housing, said shutter wheels being provided with recesses adapted to receive said blades, coupling means interconnecting said rotor wheel and said shutter wheels for simultaneous rotation in a manner enabling said blades to be cleared by said recesses upon passing said shutter wheels, first conduit means communicating with said groove for intermittently admitting a working fluid to said channels, and second conduit means communicating with said groove for intermittently removing said working fluid from said channels.

2. A device according to claim 1, wherein said first and second conduit means are provided in said housing on opposite sides of each of said shutter wheels.

3. A device according to claim 1, wherein said rotor wheel is provided with a shaft formed with an internal duct, divided into two independent passages, said duct communicating with the exterior outside said rotor wheel, at least one of said conduit means comprising a set of radial passages in said rotor wheel interconnecting said duct with said channels.

4. A device according to claim 3, wherein said shaft has a portion projecting from said rotor wheel and provided with a peripheral orifice communicating with said duct, further comprising stationary valve means on said portion periodically blocking and unblocking said orifice during rotation of said shaft and fluid-conducting means terminating at said valve means.

5. A device according to claim 4, wherein said valve means comprises a perforated ring surrounding said shaft.

6. In a rotary device, in combination, a rotor wheel having a peripheral groove, a housing surrounding said rotor wheel and defining therewith a substantially closed annular chamber, said rotor wheel being provided with angularly spaced blades subdividing said chamber into a plurality of channels, a plurality of rotary shutter wheels in said housing projecting into said chamber, thereby effectively subdividing each channel into two portions varying in length during relative rotation between said rotor wheel and said housing, said shutter wheels being provided with recesses adapted to receive said blades, coupling means interconnecting said rotor wheel and said shutter wheels for simultaneous rotation in a manner enabling said blades to be cleared by said recesses upon passing said shutter wheels, a hollow shaft rigid with said rotor wheel having a portion projecting from said rotor wheel and provided with a peripheral orifice, said rotor wheel being provided with radial passages interconnecting each of said channels with the interior of said hollow shaft, a stationary ring surrounding said portion and provided with an aperture adapted to register with said orifice in a predetermined angular position of said rotor wheel, and conduit means terminating at said aperture, said conduit means intermittently communicating with said channels by way of said aperture, said orifice, said interior and said passages during rotation of said rotor wheel.

7. In a rotary device, in combination, a rotor wheel having a peripheral groove, a housing surrounding said rotor wheel and defining therewith a substantially closed annular chamber, said rotor wheel being provided in said peripheral groove with angularly spaced blades subdividing said chamber into a plurality of channels, a plurality of rotary shutter wheels in said housing projecting into said chamber, thereby effectively subdividing each channel into two portions varying in length during relative rotation between said rotor wheel and said housing, said shutter wheels being provided with recesses adapted to receive said blades, coupling means interconnecting said rotor wheel and said shutter wheels for simultaneous rotation in a manner enabling said blades to be cleared by said recesses upon passing said shutter wheels, a hollow shaft rigid with said rotor wheel having portions projecting from said rotor wheel on opposite sides and provided each with a peripheral orifice, the interior of said hollow shaft being divided into two ducts respectively communicating with said orifices, said rotor wheel being provided with a first set of radial passages connecting each of said channels with one of said ducts and being further provided with a second set of radial passages, angularly offset from said first set, connecting each of said channels with the other of said ducts, a first stationary ring surrounding one of said portions and provided with an aperture adapted to register with one of said orifices in a predetermined angular position of said rotor wheel, a second stationary ring surrounding the other of said portions and provided with an aperture and adapted to register with the other of said orifices in a different angular position of said rotor wheel, fluid-inlet means terminating at the aperture of said first ring, and fluid-outlet means terminating at the aperture of said second ring.

References Cited in the file of this patent

UNITED STATES PATENTS

| | | |
|---|---|---|
| Re. 22,818 | Berry | Dec. 17, 1946 |
| 668,878 | Jensen | Feb. 26, 1901 |
| 958,416 | Metcalf et al. | May 17, 1910 |
| 1,239,694 | Jackman | Sept. 11, 1917 |
| 1,269,735 | Ogden | June 18, 1918 |
| 1,272,876 | Tygard | July 16, 1918 |
| 1,856,839 | Macart | May 3, 1932 |
| 2,070,631 | Sunderland | Feb. 16, 1937 |
| 2,418,793 | Selden | Apr. 8, 1947 |
| 2,742,882 | Porter | Apr. 24, 1956 |

FOREIGN PATENTS

| | | |
|---|---|---|
| 290,271 | Great Britain | Aug. 23, 1928 |
| 376,162 | Great Britain | July 7, 1932 |
| 429,598 | France | July 22, 1911 |
| 602,836 | Great Britain | June 3, 1948 |
| 643,937 | Great Britain | Sept. 27, 1950 |